DORCHESTER & SCOTT.
Hay Fork.

No. 84,712.

Patented Dec. 8, 1868.

United States Patent Office.

E. G. DORCHESTER AND URI SCOTT, OF GENEVA, NEW YORK.

Letters Patent No. 84,712, dated December 8, 1868.

IMPROVEMENT IN HAY-FORK.

The Schedule referred to in these Letters Patent and making part of the same.

*To all whom it may concern:*

Be it known that we, E. G. DORCHESTER and URI SCOTT, of Geneva, in the State of New York, have invented a new and useful Hay-Fork; and we do hereby declare that the following is a full, clear, and exact description thereof, reference being had to the accompanying drawing, making part of this specification, in which—

The nature of our invention will be understood from the drawings and specifications.

To enable others skilled in the art to make and use our invention, we will describe its construction and operation.

Figure 1:
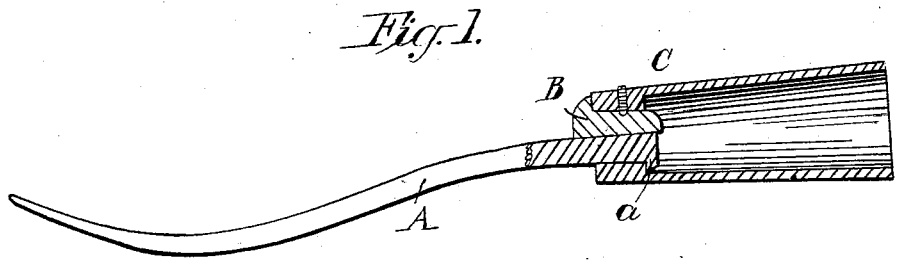
Figure 1 is a longitudinal section.
Figure 2:
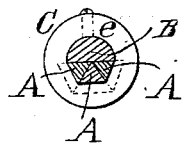
Figure 2 is transverse section, showing the shape and arrangement of the tines in the ferrule.

The tines, A, of our fork are made separate, and the ends which enter the ferrule C are made three-square, as shown in fig. 2. They also have a small projection, as shown at *a*, fig. 1, which rests against the inside of the out end of the ferrule C.

The opening in the end of the ferrule C is made sufficiently large to admit the tines of the fork, and also a wedge, B.

*e* is a small screw, put through the ferrule against the wedge, to prevent it from getting out.

The object of our invention is to make a fork, the tines of which can be easily replaced, if any should break.

Its operation is as follows:

The tines are put in the ferrule, until the projections *a* rest against inside of the end.

The wedge B is driven over the tines, until they are firm, which prevents the tines from rising and allowing the projections *a* to be released from the inside of the end of the ferrule.

The screw *e* prevents the wedge B from slipping out. If at any time a tine breaks, all that is necessary is to relieve the screw *e*, withdraw the wedge B, and replace the broken by a new tine.

What we claim as our invention, and desire to secure by Letters Patent, is—

The tines A, when constructed as herein shown and described, and wedge B, and screw *e*, or its equivalent, in combination with the ferrule C, all acting conjointly, as and for the purpose set forth.

E. G. DORCHESTER.
URI SCOTT.

Witnesses:
JOHN A. MITCHELL,
FRED'K W. PRINCE.